US012533826B2

(12) United States Patent
Chabirand et al.

(10) Patent No.: US 12,533,826 B2
(45) Date of Patent: Jan. 27, 2026

(54) MODULAR SUPPORT ELEMENT FOR ASPIRATED CUTTING IN A MACHINE FOR AUTOMATIC CUTTING OF SHEET MATERIAL

(71) Applicants: LECTRA, Paris (FR); AMVALOR, Paris (FR); ECOLE NATIONALE SUPERIEURE D'ARTS ET METIERS (ENSAM), Paris (FR); CENTRE NATIONAL DE LA RECHERCHE SCIENTIFIQUE, Paris (FR); CONSERVATOIRE NATIONAL DES ARTS ET METIERS, Paris (FR)

(72) Inventors: Didier Chabirand, Cestas (FR); Régis Lallement, Cestas (FR); Gilles Regnier, Paris (FR); Ghailen Ben Ghorbal, Paris (FR)

(73) Assignees: LECTRA, Paris (FR); AMVALOR, Paris (FR); ECOLE NATIONALE SUPERIEURE D'ARTS ET METIERS (ENSAM), Paris (FR); CENTRE NATIONAL DE LA RECHERCHE SCIENTIFIQUE, Paris (FR); CONSERVATOIRE NATIONAL DES ARTS ET METIERS, Paris (FR)

( * ) Notice: Subject to any disclaimer, the term of this patent is extended or adjusted under 35 U.S.C. 154(b) by 546 days.

(21) Appl. No.: 17/914,226

(22) PCT Filed: Mar. 10, 2021

(86) PCT No.: PCT/FR2021/050407
§ 371 (c)(1),
(2) Date: Sep. 23, 2022

(87) PCT Pub. No.: WO2021/191522
PCT Pub. Date: Sep. 30, 2021

(65) Prior Publication Data
US 2023/0114746 A1    Apr. 13, 2023

(30) Foreign Application Priority Data
Mar. 27, 2020    (FR) ...................................... 2003043

(51) Int. Cl.
*B26D 7/01*        (2006.01)
*B26D 7/06*        (2006.01)
(Continued)

(52) U.S. Cl.
CPC ............... *B26D 7/018* (2013.01); *B26D 7/20* (2013.01); *B26D 7/0625* (2013.01)

(58) Field of Classification Search
None
See application file for complete search history.

(56) References Cited

U.S. PATENT DOCUMENTS 4,205,835 A    6/1980  Gerber
4,572,357 A *  2/1986  Pearl .................... B26D 7/0675
                                                271/275
(Continued)

OTHER PUBLICATIONS

French Search Report from corresponding French Patent Application No. FR 2003043, Nov. 20, 2020.
(Continued)

*Primary Examiner* — Kavel Singh
(74) *Attorney, Agent, or Firm* — Workman Nydegger

(57) ABSTRACT

A modular cutting-support element with suction in a machine for automatic cutting of sheet material by means of blades, includes a plurality of bristles arranged in the same single line, at least some of the bristles each having a base rigidly connected to a bearing plate intended to be mounted on a support, a head opposite the base on which a sheet material to be cut is intended to rest, and a stem connecting
(Continued)

the head to the base, the largest cross-section of which is strictly included in the largest cross-section of the head, the bearing plate comprising, on each of its side surfaces, a plurality of transverse channels for the passage of suction air providing communication between an upper surface of the bearing plate from which the bristles extend and an inner surface opposite the upper surface.

20 Claims, 13 Drawing Sheets

(51) Int. Cl.
  *B26D 7/20* (2006.01)
  *B65G 15/42* (2006.01)
  *B65G 15/58* (2006.01)

(56) References Cited

U.S. PATENT DOCUMENTS

| | | | | |
|---|---|---|---|---|
| 5,596,917 | A * | 1/1997 | Gerber | B65G 21/2036 198/689.1 |
| 5,730,431 | A * | 3/1998 | Cattini | B25B 11/005 269/21 |
| 5,836,224 | A * | 11/1998 | Gerber | B26D 7/04 83/451 |
| 6,095,025 | A * | 8/2000 | Mirabello | B23K 26/702 83/451 |
| 6,199,686 | B1 * | 3/2001 | Devine | B65G 21/2036 198/836.1 |
| 6,732,854 | B2 * | 5/2004 | Kuchta | B26D 7/1854 198/495 |
| 8,132,663 | B2 * | 3/2012 | Nakai | B26F 1/3813 83/101 |
| 9,731,902 | B2 * | 8/2017 | Balsells Mercadé | B65G 27/10 |
| 11,845,611 | B2 * | 12/2023 | Balsells Mercade | B65G 15/58 |
| 2003/0019342 | A1 | 1/2003 | Zanesi | |

OTHER PUBLICATIONS

International Search Report from corresponding PCT Application No. PCT/FR2021/050407, Jul. 5, 2021.

* cited by examiner

MODULAR SUPPORT ELEMENT FOR ASPIRATED CUTTING IN A MACHINE FOR AUTOMATIC CUTTING OF SHEET MATERIAL

TECHNICAL FIELD

The present invention relates to a cutting support with suction in an automatic cutting machine for sheet materials, in particular textile materials, using a vibrating blade penetrating into the cutting support. It relates, more precisely, to a modular element intended to form such a cutting support.

PRIOR ART

A field of application of the invention is that of the automatic cutting of stacks or pads of material sheets, in particular textile materials, using a vibrating blade penetrating into a cutting support with suction.

Typically, a vibrating blade cutting machine comprises, in particular, a cutting conveyor which drives the stack of sheets during the cutting operation. This cutting conveyor is housed in a casing inside which a high vacuum is established in order to keep the sheets of material to be cut immobile during the cutting operation.

In this type of machine, the cutting conveyor also acts as a penetrating cutting support for the vibrating blade. Indeed, it is well known to make the cutting support penetrable by the blade so that during the cutting operation the blade cannot only pass completely through the material to be cut but can also extend downwards beyond the support surface and into the bed of material providing such a surface.

In order to do this, the cutting support generally consists of an assembly of blocks driven by a belt. More precisely, each block comprises a plurality of bristles mounted in several parallel rows on a bearing plate, each bristle having a head forming the support for the sheet material to be cut. Transverse channels are produced through the bearing plate in order to allow the passage of suction air. These blocks thus make it possible to support the material to be cut under suction while being able to penetrate it with the cutting blade.

The cutting support blocks are the most often obtained by moulding a plastic material. The moulding makes it possible to obtain a block in a single piece with the bearing plate and the assembly of bristles thereof. In order to ensure the mould release of such a part, it is necessary that the bristles, which generally have a conical or cylindrical shape, have a diameter at the head that is smaller than the diameter at the base. Reference can be made, in particular, to document U.S. Pat. No. 4,205,835 which describes an embodiment of such a cutting support block.

However, the tip of the cutting blades being bevelled, the interference between the blade and the bristles is promoted by the conical shape of the bristles combined with their flexibility, which can lead to partial or total cuts of bristles. The position at the top of this cut is directly linked to the conical shape of the bristles and of the blade or the position of the blade with respect to the generatrix of the bristles encountered by the blade.

Furthermore, the need to have bristles, the base of which has a larger diameter than the head, has the disadvantage of limiting the space on the bearing plate for producing the channels for passage of suction air, which reduces the suction capacity of the cutting support.

DISCLOSURE OF THE INVENTION

The object of the invention is therefore that of providing a cutting support which does not have the above-mentioned disadvantages.

According to the invention, this object is achieved by a modular cutting-support element with suction in a machine for automatic cutting of sheet material by means of blades, comprising a plurality of bristles arranged in the same single line, at least some of the bristles each having a base rigidly connected to a bearing plate intended to be mounted on a support, a head opposite the base on which a sheet material to be cut is intended to rest, and a stem connecting the head to the base, the largest cross-section of which is strictly included in the largest cross-section of the head, the bearing plate comprising, on each of its side surfaces, a plurality of transverse channels for the passage of suction air providing communication between an upper surface of the bearing plate from which the bristles extend and an inner surface opposite the upper surface.

Here, "cross-section" shall mean a section produced perpendicular to the axis of the bristle. Moreover, here "strictly included" shall mean that all the points of the largest cross-section of the stem of each bristle are included (or encompassed) in the largest cross-section of the head of the bristle, but that at least one point of the largest cross-section of the head is not included in the largest cross-section of the stem. For example, when the head and the stem of the bristle each have a circular cross-section, this condition is equivalent to that in which the cross-section of the head has a diameter strictly greater than that of the stem.

The invention is characterised in that it makes it possible to produce cutting supports by mounting a plurality of modular elements on at least one support. Since each modular element comprises bristles arranged in the same single line, it is possible to give at least some bristles a head having a cross-section encompassing a cross-section of the stem, while retaining the ability to manufacture these modular elements by moulding in a single part with their bearing plate and their bristles. Such a geometric shape of the bristles has the advantage of limiting the interactions between the tip of the cutting blade and the tangential bristles.

Moreover, the support surface offered by these modular elements is better due to the fact that the head of the bristles has a larger cross-section than that of the stems. In addition, by reducing the cross-section of the stems and bases of the bristles, it is easier to increase the diameter of the transverse channels for the passage of suction air, and thus to improve the porosity to air of the bearing plate in order to maintain maximum suction and to limit pressure drops.

Another advantage connected to the production of the cutting supports by mounting a plurality of modular elements according to the invention rests in the possibility of being able to propose cutting supports differentiated by cutting blade, loom, etc.

The bearing plate preferably further comprises, at each of its side surfaces, at least one longitudinal channel extending between the longitudinal ends of the bearing plate and communicating with the transverse channels in order to uniformly distribute suction air in said transverse channels. This feature makes it possible to make the suction of the modular element more uniform over the entire surface of the bearing plate.

The bearing plate likewise preferably further comprises, at each of its side surfaces, at least one assembly member for mechanical assembly with another modular element.

In this case, each mechanical assembly member can comprise at least one lug protruding with respect to a side surface of the bearing plate and intended to interlock in a corresponding recess of an assembly member of an adjacent modular element, and a recess set back with respect to the side surface of the bearing plate and intended to receive, by interlocking, a corresponding lug of the assembly member of the adjacent modular element.

At least some bristles can comprise a head having a conical frustum shape and a stem having a cylindrical shape. In this case, the head of these bristles can have a conical frustum shape having a circular cross-section on the inner side which is greater than that on the outer side. Alternatively, the head of these bristles can have an inverted conical frustum shape having a circular cross-section on the outer side which is greater than that on the inner side.

Alternatively, at least some bristles can have a stem and a head having a polygonal cross-section, for example a stem of hexagonal cross-section and a head with octagonal cross-section.

The bearing plate can further comprise an attachment at each longitudinal end for assembling the modular element on a support, and two fingers projecting inwards and acting as centring elements on the support.

The transverse channels can have a semicircular cross-section so as to form cylindrical transverse passages when another modular element is mounted against said element.

The bristles of a same modular element can be arranged in a straight line forming a single row of bristles. Alternatively, the bristles can be arranged in a broken line forming two parallel rows of bristles.

The modular element can comprise at least two bristles, the respective heads of which have different shapes.

Another object of the invention is a cutting support with suction for a machine for automatic cutting of sheet material comprising a plurality of modular elements as defined above and mounted on at least one support.

The modular elements can be mounted on the support so as to obtain an ordered alignment of bristles. Alternatively, modular elements can be mounted on the support so as to obtain a staggered alignment of bristles. In another alternative, some modular elements are mounted on the support so as to obtain an ordered alignment of the bristles and some other modular elements are mounted on the same support so as to obtain a staggered alignment of the bristles.

The distance between two adjacent bristles is preferably greater than the largest dimension of the cross-section of the stem of the bristles. This feature makes it possible to prevent a cut bristle that comes to the bottom of the block from spreading the surrounding bristles.

DESCRIPTION OF THE EMBODIMENTS

The conveyor of a vibrating blade cutting machine can drive the material to be cut during the cutting operation. The upper part of the conveyor acts as cutting support and the lower part is generally housed in a casing inside which a high vacuum is established in order to keep the material to be cut immobile during the cutting operation.

Figure 1:
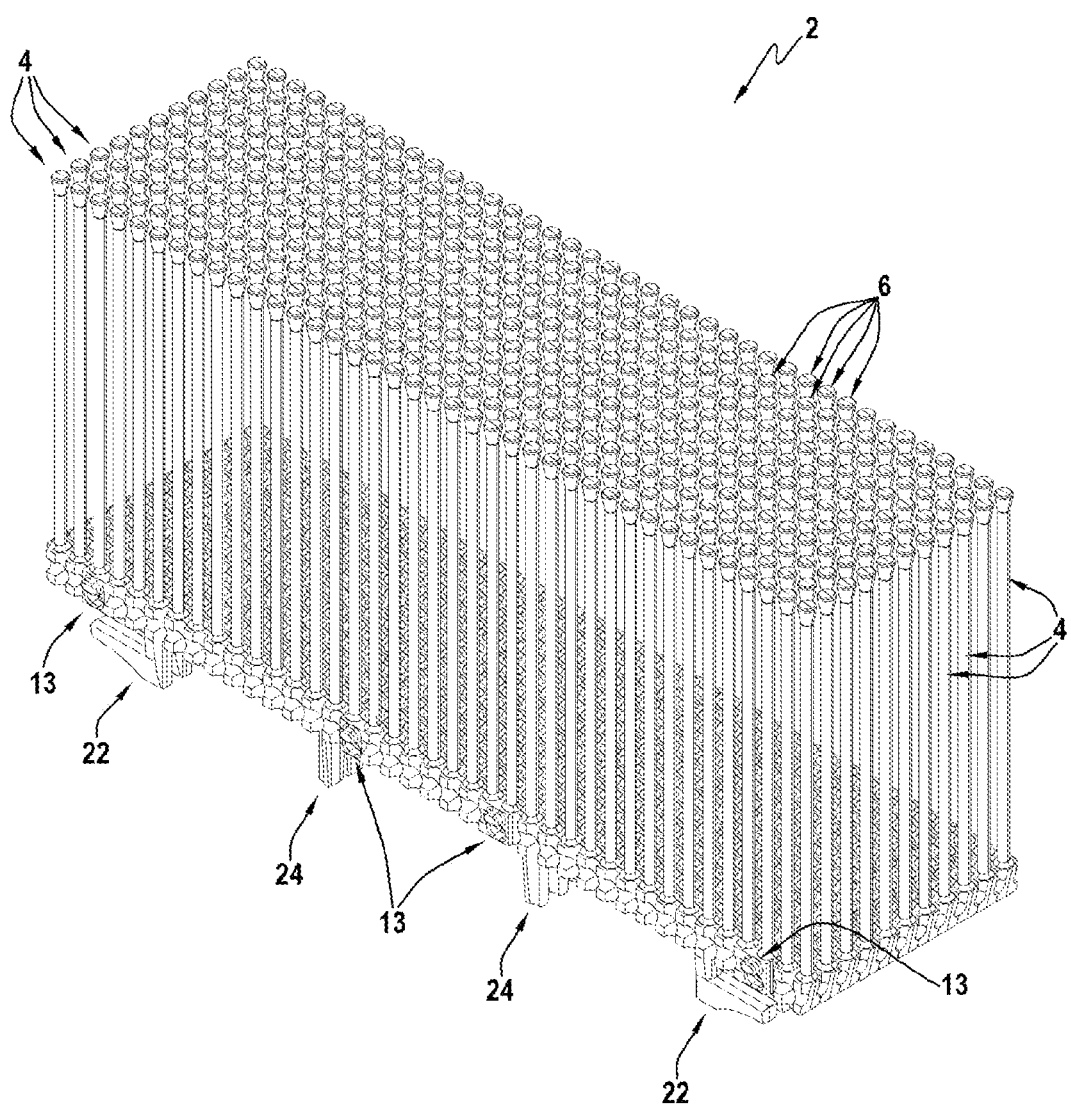
FIG. 1 is a perspective view of a cutting support block according to an embodiment of the invention (so-called "ordered" configuration).

The cutting support itself can typically consist of an assembly of a plurality of blocks mounted on a drive belt such as the cutting support block 2 shown in FIG. 1.

This cutting support block 2 is composed of the assembly of a plurality of modular elements 4 (for example eleven in number in the embodiment shown by FIG. 1). The assembly of modular elements is carried out by interlocking of their respective side surfaces as described below.

Figure 2:
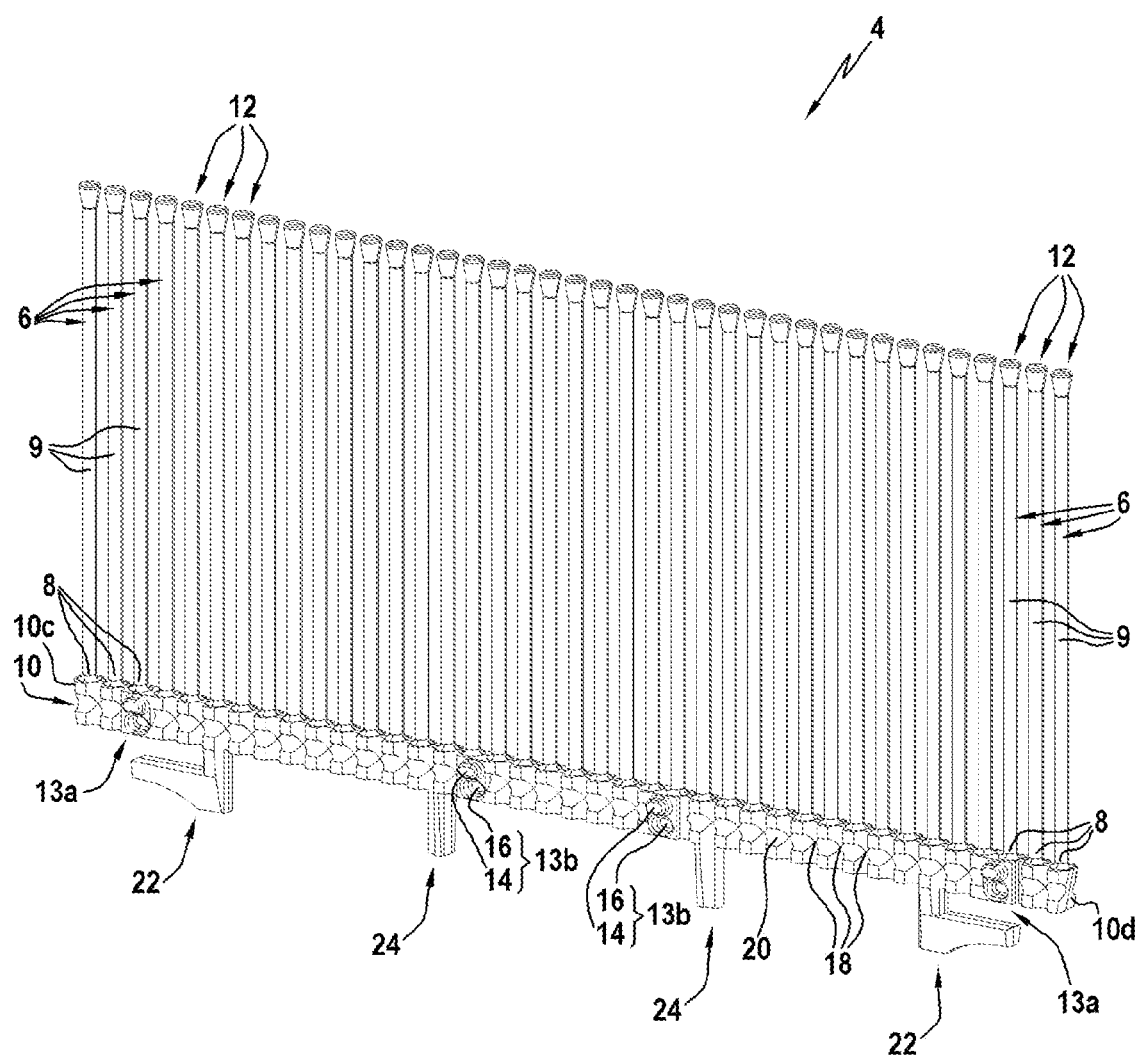
FIG. 2 is a perspective view of a modular element for obtaining the cutting support of FIG. 1.
Figure 3:
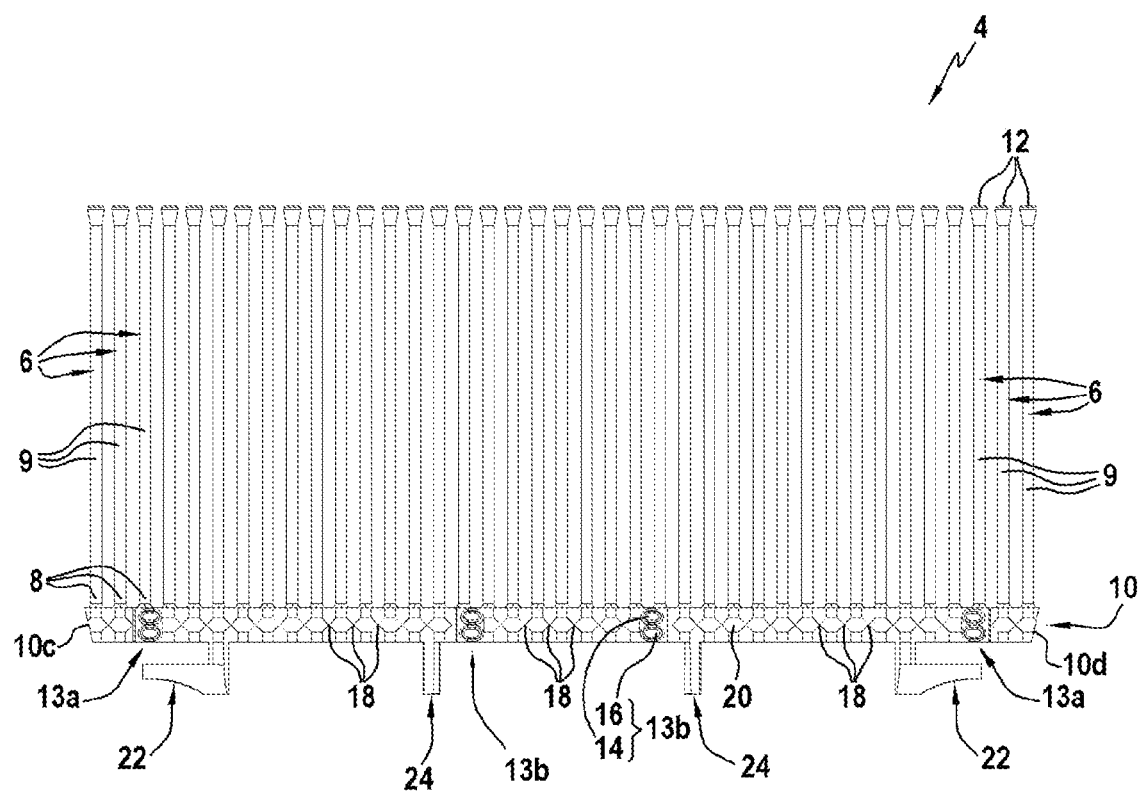
FIG. 3 is a front view of the modular element of FIG. 2.

As shown more precisely in FIGS. 2 and 3, each modular element 4 according to the invention comprises a plurality of bristles 6 which are aligned along the same single row of bristles.

These bristles 6 each have a base 8 which is rigidly connected of a bearing plate 10 common to the assembly of bristles, a head 12 which is opposite the base, and which is intended to serve as cutting support, and a stem 9 which connects the base to the head.

Furthermore, each bristle 6 has the particular property of possessing a head 12 for which the largest cross-section (in other words the largest section produced perpendicular to the main axis of the bristle) encompasses the largest cross-section of its stem 9. In other words, the largest cross-section of the head is strictly larger than the largest cross-section of the stem 9 (i.e. it surrounds it by being larger).

Figure 4:
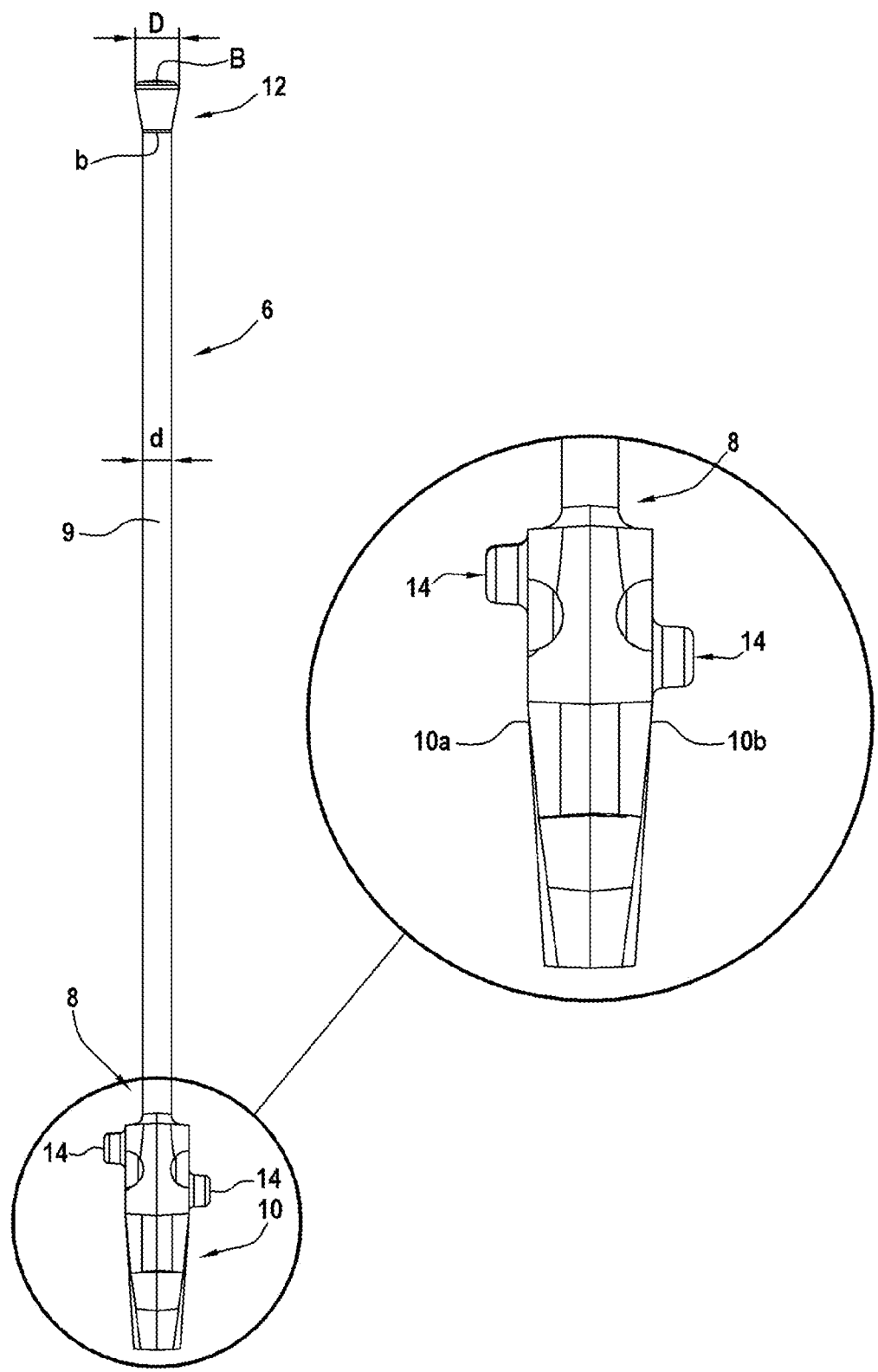
FIG. 4 is a side view of the modular element of FIG. 2.

For example, as shown in FIG. 4, when the head 12 and the stem 9 of the bristle each have a circular cross-section, the largest cross-section of the head has a diameter D which is strictly greater than the largest diameter d of the cross-section of the stem.

In addition, in this embodiment, the head 12 of each bristle has an inverted conical frustum shape, having a circular cross-section of the outer side which is greater than that of the inner side (i.e. the large base B of the conical frustum is arranged towards the outside of the modular element and the small base b of the conical frustum is facing inwards).

Of course, the invention is not limited to these particular geometric shapes for the bristle, its head and its base. For example, it is possible to imagine that the base has a conical frustum or polygonal based pyramid shape, and the head has a cross-section other than circular (square, hexagonal, etc.).

In order to enable the mechanical assembling together of several modular elements 4, the bearing plate 10 of each of them can comprise, at each of its two side surfaces 10a, 10b, at least one member 13 for mechanical assembly with another modular element.

For example, each of the side surfaces 10a, 10b of the bearing plate of a modular element can be provided with four mechanical assembly members spaced apart from one another, namely: an end assembly member 13a at each of its longitudinal ends 10c, 10d and two central assembly members 13b positioned between its longitudinal ends.

Again, by way of non-limiting example, the assembly members 13 of the two side surfaces of a modular element can be aligned facing one another.

As shown more precisely in the example of FIG. 3, the mechanical assembly members 13 can each comprise at least one lug 14 which protrudes with respect to the side surface of the bearing plate and a recess 16 set back with respect to the side surface of the bearing plate, the lug and the recess being, for example, positioned transversally one above the other.

During the mechanical assembly of two modular elements, the lugs 14 of the mechanical assembly members of one of the modular elements interlocks inside the recesses 16 of the mechanical assembly members of the other modular element (and vice versa) with a retention that can be provided by an adhesive or by clipping, for example. Assembling together of several modular elements makes it possible to ensure continuity of the upper surface of the bearing plate.

Alternatively, the modular elements could be simply positioned on either side of a block or directly on a support and held together by a suitable mechanism.

Again, according to the invention, the two side surfaces 10a, 10b of the bearing plate 10 of the modular element each comprise a plurality of transverse channels 18 which provide communication between the outer surface of the bearing plate (in other words the surface from which the bristles extend) and its inner surface (in other words the surface opposite the outer surface).

These transverse channels 18, which are advantageously regularly distributed over the entire length of the bearing plate, give a porosity to the bearing plate by allowing suction air to pass through the bearing plate.

By way of example, the transverse channels 18 can each have a semicircular cross-section so as to form cylindrical transverse passages when two modular elements are mounted one against the other.

Of course, it is possible of envisage a different shape for the cross-section of the transverse channels, for example an elliptical, polygonal or other shape.

According to an advantageous arrangement, the bearing plate further comprises, at each of its two side surfaces 10a, 10b, a longitudinal channel 20 which extends between its two longitudinal ends 10c, 10d and which communicates with the transverse channels 18 in order to uniformly distribute suction air in the latter.

By way of example, the longitudinal channel 20 can have a semicircular cross-section so as to form a cylindrical longitudinal passage when two modular elements are mounted one against the other.

Of course, it is possible of envisage a different shape for the cross-section of the longitudinal channel, for example an elliptical, polygonal or other shape.

According to another advantageous arrangement, the bearing plate 10 of the modular element further comprises at least one attachment 22 in the form of a hook at each of its longitudinal ends 10c, 10d, and two fingers 24 projecting inwards into the bearing plate.

The hook-shaped attachments 22 make it possible to mount the cutting support block formed by the assembly of several modular elements on a support (not shown) intended to be mounted directly on the drive belt of the cutting conveyor. With regard to the fingers 24, they act as centring elements on the support.

Of course, it is possible of envisage other shapes of attachments for mounting the modular elements on a block or directly on a cutting support. For example, these attachments could be T-shaped.

In the embodiment of FIGS. 1 to 4, the modular elements are assembled within a same block so as to obtain an ordered alignment of bristles, in other words so that the bristles 6 within a same block 2 are aligned in the longitudinal and transverse directions.

Figure 5:
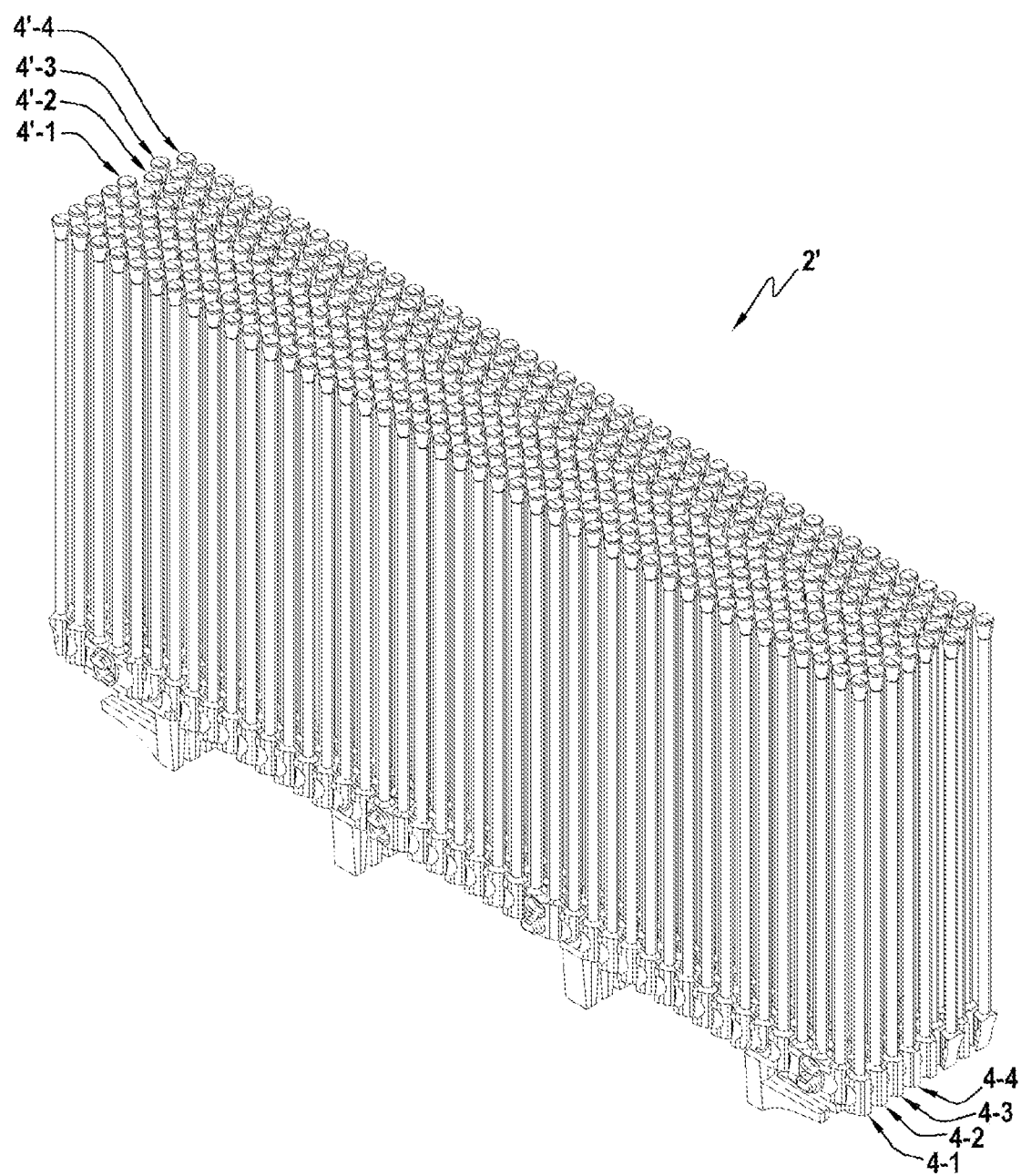
FIG. 5 is a perspective view of a cutting support block according to another embodiment of the invention (so-called "staggered" configuration).
Figure 6:
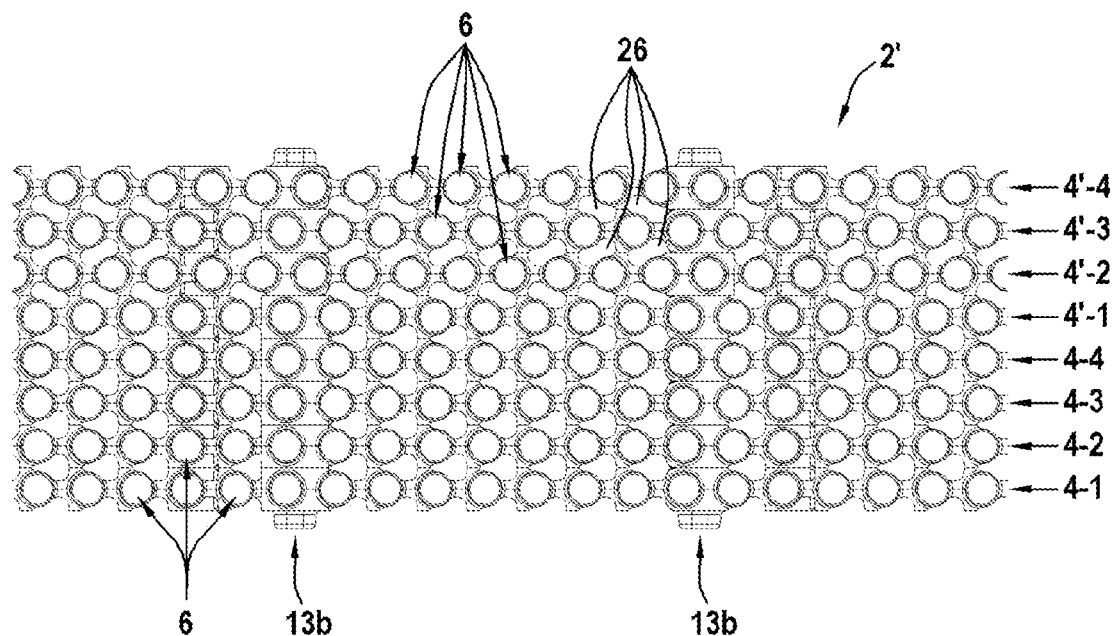
FIG. 6 is a partial view from above of the cutting support block of FIG. 5.
Figure 7:
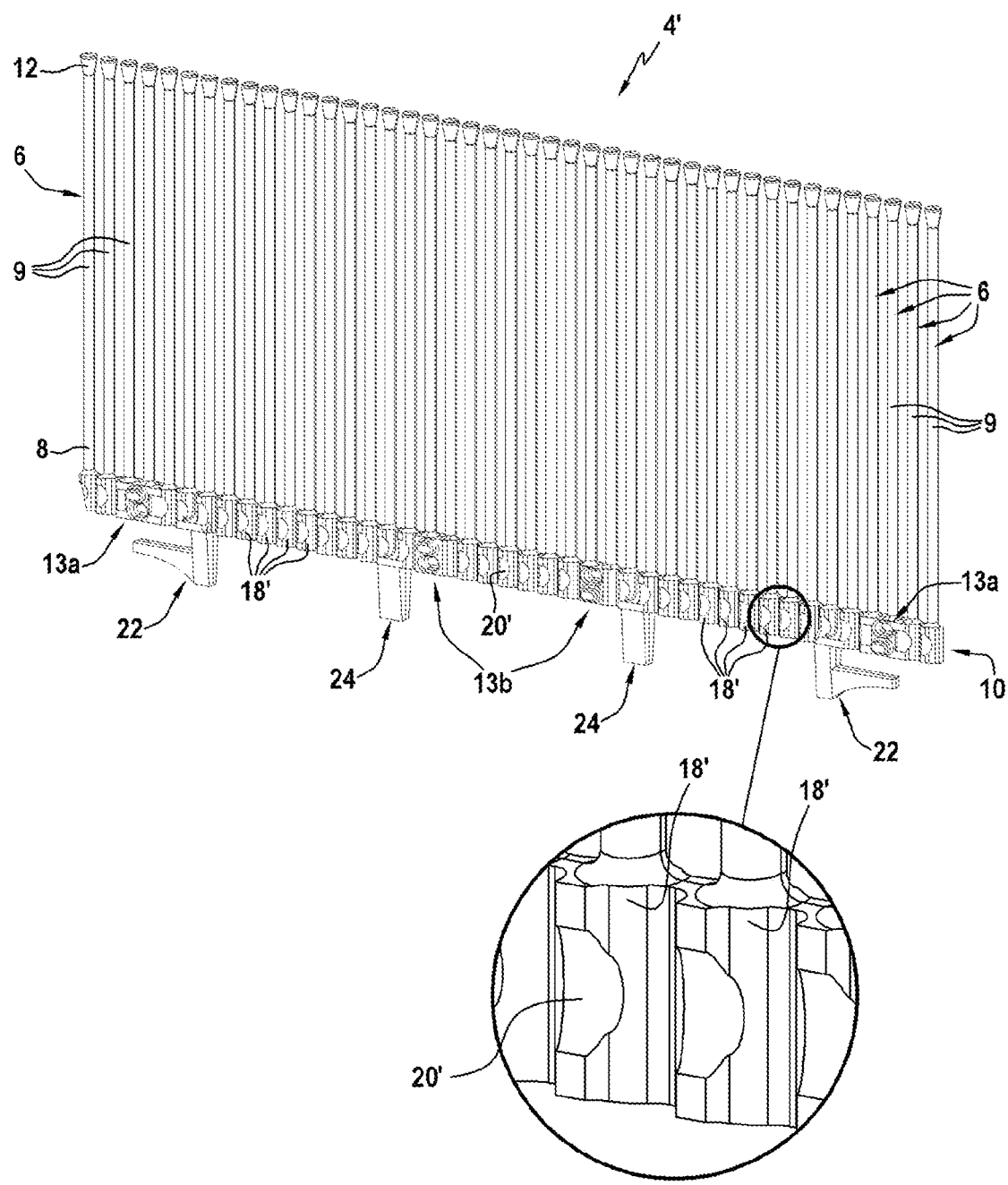
FIG. 7 is a perspective view of a modular element for obtaining the cutting support block of FIG. 5.

In another embodiment shown by FIGS. 5 to 7, at least some of the modular elements of a same block can be assembled so as to obtain a staggered alignment of the bristles.

Hence, in the block 2' shown in FIGS. 5 and 6, the modular elements 4-1 to 4-4 are assembled so as to obtain an ordered alignment of bristles, while the modular elements 4'-1 to 4'-4 are assembled so as to obtain a staggered alignment of bristles. Of course, other configurations are possible according to need, by mixing the two types of modular elements.

FIG. 7 shows in detail and in perspective a modular element 4' for obtaining a staggered assembly of bristles within a same support block.

Compared with the embodiment of FIGS. 1 to 4, this modular element 4' differs through the shape of the transverse channels 18' for the passage of suction air between the inner surface and the outer surface of the bearing plate 10.

Indeed, in this embodiment, the transverse channels 18' of the modular element 4' each have a cross-section in the shape of a double semicircle so as to form bean-shaped transverse passages 26 when another modular element is assembled on said element (see FIG. 6).

Furthermore, a longitudinal channel 20' extending between the longitudinal ends of the bearing plate communicates with the transverse channels 18' in order to uniformly distribute suction air in the latter.

Figure 8:
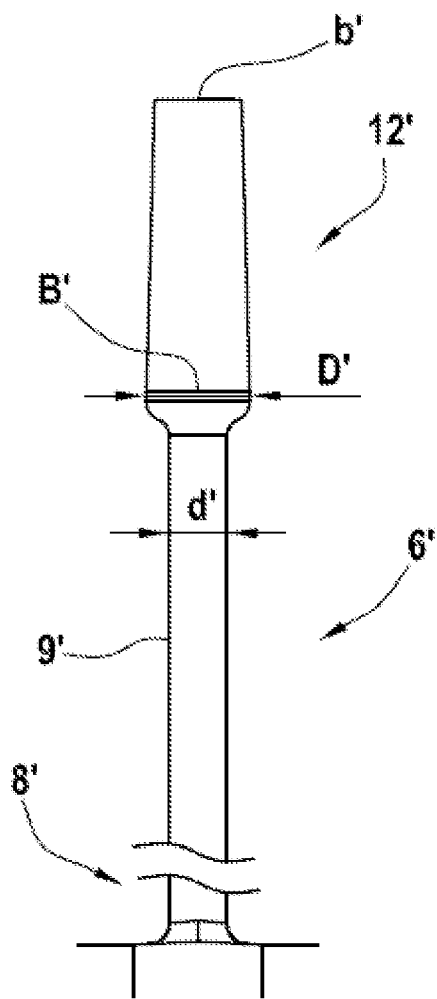
FIG. 8 is a view of a modular element bristle head according to an alternative embodiment.

FIG. 8 shows a modular element bristle head according to an alternative embodiment, this shape of bristle being equally as applicable to modular elements of the embodiment of FIGS. 1 to 4 as to those of the embodiment of FIGS. 5 to 7.

In this alternative embodiment, the head 12' of the bristles 6' has a conical frustum shape, having a circular cross-section of the inner side which is greater than that of the outer side (i.e. the small base b' of the conical frustum is arranged towards the outside of the modular element and the large base B' of the conical frustum is facing inwards).

In this alternative embodiment, the head 12' also has a circular cross-section for which the largest cross-section (in other words at the largest base B') has a diameter D' which is strictly greater than the largest diameter d' of the circular cross-section of the stem 9' of the bristle.

Furthermore, whatever the alternative embodiment of the bristles of the modular elements 4, 4', the stem 9, 9' of each bristle 6, 6' can have a cylindrical shape between its head 12, 12' and its base 8, 8'. Of course, any other shape is also possible (for example with a cross-section that is square, polygonal, etc.).

Figure 9:
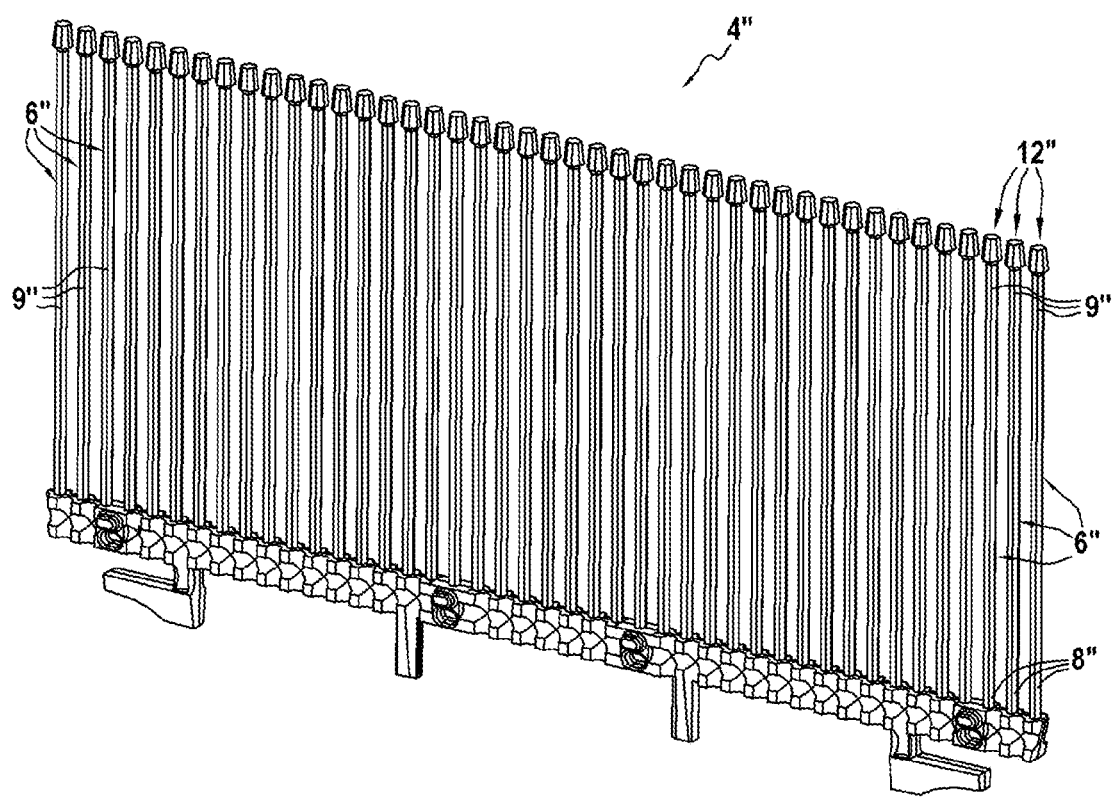
FIG. 9 is a perspective view of a modular element according to yet another alternative embodiment of the invention.

Hence, FIG. 9 shows yet another alternative embodiment of a modular cutting support element 4", wherein the stem 9" of the bristles 6" has a hexagonal cross-section between the head 12″ and the base 8‴. Furthermore, in this alternative embodiment, the head 12″ has an octagonal cross-section.

Such a general shape of the bristles 6, 6', 6″ and the production of modular elements comprising single rows of bristles make it possible to manufacture the latter by moulding in a single piece. In particular, such a configuration makes it possible to overcome the bristle shape constraints which were required for mould release.

Of course, it is possible of envisage another method of manufacture of the modular elements, for example by additive manufacturing or any other industrial manufacturing process.

It should be noted again that all the bristles of a same modular element do not necessarily have a head for which the cross-section encompasses the largest cross-section of the stem. Indeed, it is possible to envisage that only some of the bristles of a same modular element have such a feature, the other bristles of the modular element having a head cross-section identical to that of their stem.

Figure 10A:
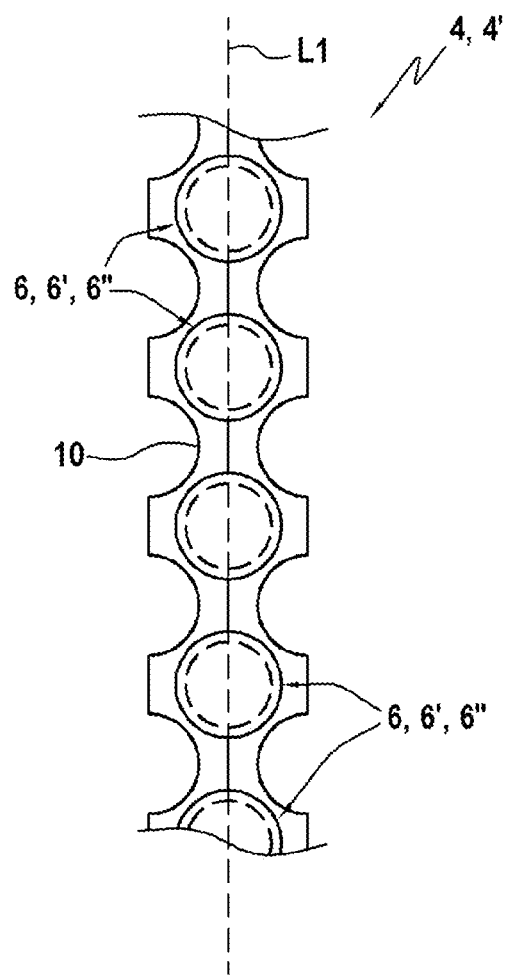
FIG. 10A shows an alternative arrangement of the bristles of a same modular element according to the invention.
Figure 10B:
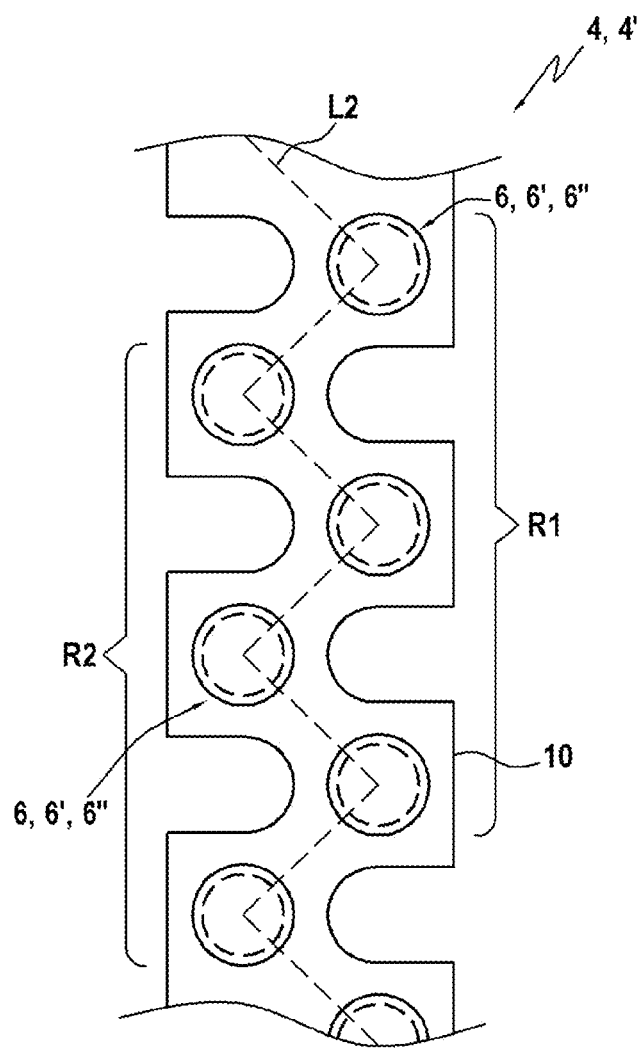
FIG. 10B shows another alternative arrangement of the bristles of a same modular element according to the invention.

Furthermore, FIGS. 10A and 10B show two possible arrangements for the bristles 6, 6', 6″ of a same modular element 4, 4'.

In the exemplary arrangement of FIG. 10A, the bristles of a same modular element are arranged in a straight line L1 forming a single row of bristles. In other words, the respective longitudinal axes of the bristles are all aligned on a same straight line L1.

Alternatively, in the embodiment of FIG. 10B, the bristles of a same modular element can be arranged along a broken line (or in a sawtooth) L2, so as to form two parallel rows of bristles R1, R2.

Whatever the alternative embodiment, it will be noted that the modular element can be manufactured by moulding in a single piece.

Figure 11:
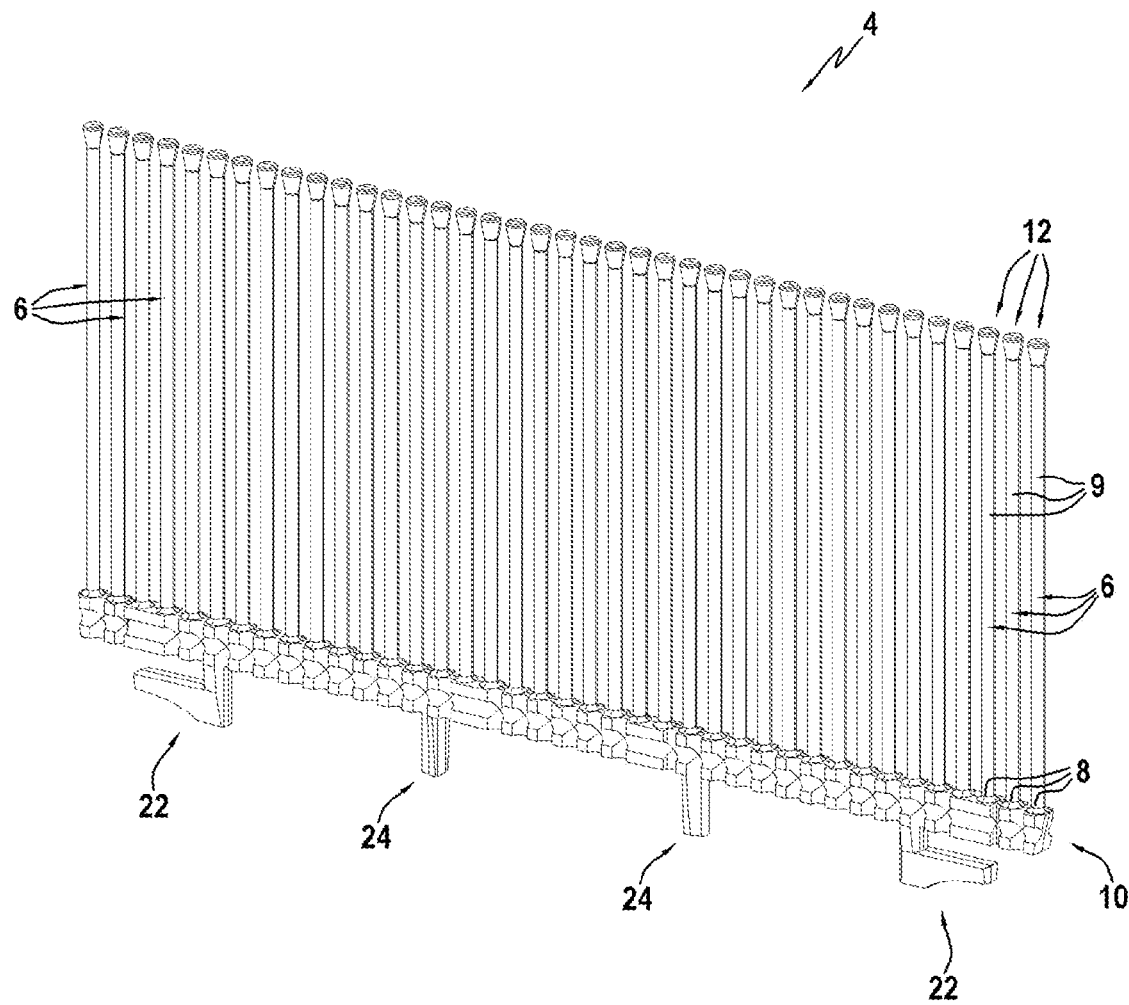
FIG. 11 is a perspective view of a modular element according to the invention without a mechanical assembly member.

Similarly, as shown in FIG. 11, the modular element 4 according to the invention may have no mechanical assembly member. In this case, the modular elements of a same support are simply positioned against one another on the same support and held together by a suitable mechanism.

Figure 12:
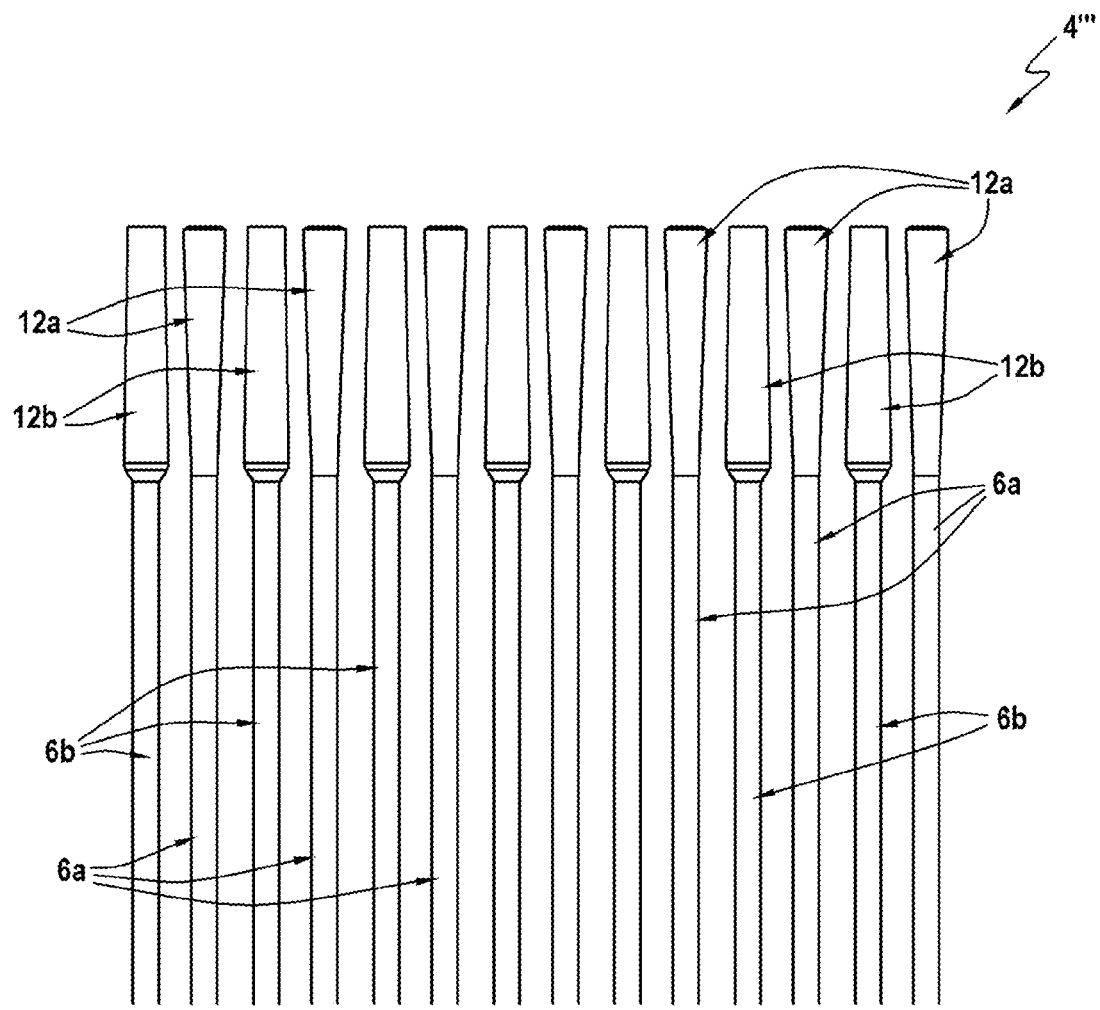
FIG. 12 is a partial view of a modular element according to yet another alternative embodiment of the invention.

FIG. 12 shows, in a partial manner, yet another alternative embodiment of a modular cutting support element 4‴, wherein the heads of the bristles have different shapes.

Hence, in the exemplary embodiment of FIG. 12, the modular element comprises alternating bristles 6a for which the respective head 12a has a conical frustum shape for which the large base is facing the outside and bristles 6b for which the respective head respective 12b has a conical frustum shape for which the large base is facing inwards.

Such a "head-to-tail" alternation of the bristle heads has the advantage of increasing the apparent density of bristles, which increases the holding of the fabric.

Of course, it is possible of envisage any other possible configuration (with several different shapes of bristle heads) according to needs. Similarly, this alternative embodiment can be combined with other previously described alternative embodiments.

The invention claimed is:

1. A modular element of a cutting support with suction in a machine for automatic cutting of sheet material by means of blades, comprising:
   a plurality of bristles arranged in the same single line, at least some bristles each having a base rigidly connected to a bearing plate intended to be mounted individually on a support,
   a head opposite the base on which a sheet material to be cut is intended to rest, and
   a stem connecting the head to the base, a largest cross-section of which is strictly included in the largest cross-section of the head,
   the bearing plate comprising, on each of its side surfaces, a plurality of transverse channels for the passage of suction air providing communication between an upper surface of the bearing plate from which the bristles extend and an inner surface opposite the upper surface.

2. The modular element according to claim 1, wherein the bearing plate further comprises, at each side surface of the bearing plate, at least one longitudinal channel extending between longitudinal ends of the bearing plate and communicating with the transverse channels in order to uniformly distribute suction air in said transverse channels.

3. The modular element according to claim 1, wherein the bearing plate further comprises, at each side surface of the bearing plate, at least one member for mechanical assembly with another modular element.

4. The modular element according to claim 3, wherein each assembly member comprises at least one lug protruding with respect to a side surface of the bearing plate and intended to interlock into a corresponding recess of an assembly member of an adjacent modular element, and a recess set back with respect to the side surface of the bearing plate and intended to receive, by interlocking, a corresponding lug of the assembly member of the adjacent modular element.

5. The modular element according to claim 1, wherein at least some bristles comprise a head having a conical frustum shape and a stem having a cylindrical shape.

6. The modular element according to claim 5, wherein the head of each bristle has a conical frustum shape having a circular cross-section on the inner side which is greater than that on an outer side.

7. The modular element according to claim 5, wherein the head of each bristle has a reversed conical frustum shape having a circular cross-section on an outer side which is greater than that on the inner side.

8. The modular element according to claim 1, wherein at least some bristles have a stem and a head with a polygonal cross-section.

9. The modular element according to claim 8, wherein the stem of the bristles has a hexagonal cross-section and the head of said bristles has an octagonal cross-section.

10. The modular element according to claim 1, wherein the bearing plate further comprises an attachment at each longitudinal end for assembling the modular element on a support and two fingers projecting inwards and acting as centering elements on the support.

11. The modular element according to claim 1, wherein the transverse channels have a semicircular cross-section so as to form cylindrical transverse passages when another modular element is mounted against the modular element.

12. The modular element according to claim 1, wherein the modular element is obtained by moulding.

13. The modular element according to claim 1, wherein the bristles are arranged in a straight line forming a single row of bristles.

14. The modular element according to claim 1, wherein the bristles are arranged in a broken line forming two parallel rows of bristles.

15. The modular element according to claim 1, comprising at least two bristles for which the respective heads have different shapes.

16. A cutting support with suction in a machine for automatic cutting of sheet material comprising a plurality of modular elements according to claim 1 mounted on at least one support.

17. The cutting support according to claim 16, wherein the modular elements are mounted on the support so as to obtain an ordered alignment of the bristles.

18. The cutting support according to claim 16, wherein the modular elements are mounted on the support so as to obtain a staggered alignment of the bristles.

19. The cutting support according to claim 16, wherein some modular elements are mounted on the support so as to obtain an ordered alignment of the bristles and some other modular elements are mounted on the same support so as to obtain a staggered alignment of the bristles.

20. The cutting support according to claim 16, wherein a distance between two adjacent bristles is greater than a largest dimension of the cross-section of the stem of the bristles.

* * * * *